(12) United States Patent
Shah et al.

(10) Patent No.: US 11,516,344 B2
(45) Date of Patent: Nov. 29, 2022

(54) SYSTEMS AND METHODS FOR ASSIGNING CONTACTS IN A BLENDED CONTACT CENTER

(71) Applicant: Avaya Inc., Santa Clara, CA (US)

(72) Inventors: Shamik Suresh Shah, Pune (IN); Prasant Kumar Jena, Pune (IN); Amit Pansuria, Pune (IN)

(73) Assignee: Avaya, Inc., Santa Clara, CA (US)

( * ) Notice: Subject to any disclaimer, the term of this patent is extended or adjusted under 35 U.S.C. 154(b) by 304 days.

(21) Appl. No.: 16/260,893

(22) Filed: Jan. 29, 2019

(65) Prior Publication Data

US 2020/0244806 A1 Jul. 30, 2020

(51) Int. Cl.
| H04M 3/00 | (2006.01) |
| H04M 5/00 | (2006.01) |
| H04L 12/66 | (2006.01) |
| H04M 3/523 | (2006.01) |
| H04M 3/51 | (2006.01) |

(52) U.S. Cl.
CPC ....... *H04M 3/5232* (2013.01); *H04M 3/5141* (2013.01); *H04M 3/5175* (2013.01)

(58) Field of Classification Search
CPC ............ H04M 3/5175; H04M 3/5191; H04M 2203/401; H04M 3/5183; H04M 3/5233; H04M 3/523; H04M 3/5158; H04M 3/5235; H04M 3/5238; H04M 2203/402; G06Q 10/06393; G06Q 10/063112; G06Q 10/06395; G06Q 10/06398
USPC ............ 379/265.02, 265.03, 265.06, 265.07, 379/265.09, 265.12, 266.07; 705/3, 7.15, 705/7.29, 7.39, 7.42
See application file for complete search history.

(56) References Cited

U.S. PATENT DOCUMENTS

| 5,214,688 | A | * | 5/1993 | Szlam | H04M 3/36 379/111 |
| 5,467,391 | A | | 11/1995 | Donaghue, Jr. et al. | |
| 5,594,791 | A | * | 1/1997 | Szlam | G06Q 30/016 379/265.09 |
| 5,784,452 | A | * | 7/1998 | Carney | H04M 3/51 379/265.06 |
| 5,978,465 | A | * | 11/1999 | Corduroy | H04M 3/51 379/243 |

(Continued)

OTHER PUBLICATIONS

"Nailed-Up Connections"; Genesys Pure Engage System Guide—SIP Server; retrieved from http://docs.genesys.com/Documentation/SIPS/8.1.1/Dep/NailedUp on Dec. 3, 2018.

(Continued)

*Primary Examiner* — Kharye Pope
(74) *Attorney, Agent, or Firm* — Stevens & Showalter LLP

(57) ABSTRACT

Assigning contacts in a contact center including extracting, by a blend application, contextual information related to an inbound contact received at a first port and transmitting, by the blend application, the contextual information to an outbound dialer. The outbound dialer places an outbound call from a second port to the first port, automatically patches the second port with a third port that is associated with an agent assigned to an outbound campaign, and connects a customer device associated with the inbound contact to a device associated with the agent, during which the agent remains assigned to the outbound campaign.

20 Claims, 10 Drawing Sheets

(56) References Cited

U.S. PATENT DOCUMENTS

| | | | |
|---|---|---|---|
| 6,310,951 B1* | 10/2001 | Wineberg | G06Q 10/06398 379/265.06 |
| 6,463,148 B1 | 10/2002 | Brady | |
| 6,480,601 B1* | 11/2002 | McLaughlin | H04M 3/523 379/212.01 |
| 7,035,927 B2 | 4/2006 | Flockhart et al. | |
| 7,302,051 B1* | 11/2007 | Strandberg | H04M 3/424 379/210.01 |
| 8,234,141 B1 | 7/2012 | Flockhart et al. | |
| 8,578,396 B2 | 11/2013 | Bland et al. | |
| 8,582,753 B1 | 11/2013 | Heller | |
| 8,634,543 B2 | 1/2014 | Flockhart et al. | |
| 8,654,964 B1* | 2/2014 | Noble, Jr. | H04M 3/5158 379/265.01 |
| 9,253,310 B2 | 2/2016 | Christensen et al. | |
| 9,472,188 B1* | 10/2016 | Ouimette | G10L 15/1815 |
| 9,473,632 B2 | 10/2016 | Schwartz et al. | |
| 10,516,781 B1* | 12/2019 | Koster | H04M 3/5158 |
| 2005/0135385 A1 | 6/2005 | Jenkins et al. | |
| 2006/0160395 A1 | 7/2006 | Macauley et al. | |
| 2007/0162542 A1* | 7/2007 | Lawrence | G06Q 30/02 709/203 |
| 2008/0077525 A1* | 3/2008 | Willey | G06Q 20/102 705/40 |
| 2008/0159521 A1* | 7/2008 | Sneyders | H04M 3/5158 379/266.07 |
| 2009/0168991 A1* | 7/2009 | Zgardovski | H04M 3/5158 379/266.07 |
| 2009/0249444 A1* | 10/2009 | Macauley | H04Q 1/138 726/3 |
| 2011/0123005 A1* | 5/2011 | Segall | H04M 3/42059 379/88.13 |
| 2012/0099720 A1* | 4/2012 | Soundar | H04M 3/5183 379/265.02 |
| 2012/0224682 A1* | 9/2012 | Zgardovski | G06Q 10/063112 379/266.07 |
| 2013/0223608 A1 | 8/2013 | Flockhart et al. | |
| 2013/0244632 A1* | 9/2013 | Spence | H04M 3/51 455/415 |
| 2013/0317977 A1* | 11/2013 | Lake, Jr. | G06Q 50/16 705/39 |
| 2014/0059126 A1 | 2/2014 | Klemm et al. | |
| 2014/0236626 A1* | 8/2014 | Reddy Bynagari | G06Q 50/24 705/3 |
| 2015/0055773 A1* | 2/2015 | Brimshan | H04M 3/5158 379/266.01 |
| 2015/0131793 A1* | 5/2015 | Riefel | H04M 3/00 379/265.06 |
| 2015/0264173 A1* | 9/2015 | Diana | H04M 3/5191 379/93.02 |
| 2016/0353310 A1* | 12/2016 | Gorny | H04L 41/22 |

OTHER PUBLICATIONS

Avaya Proactive Outreach Manager Overview and Specification—Release 3.0.4, Issue 1; Jun. 2009; pp. 1-78; Avaya Inc.

* cited by examiner

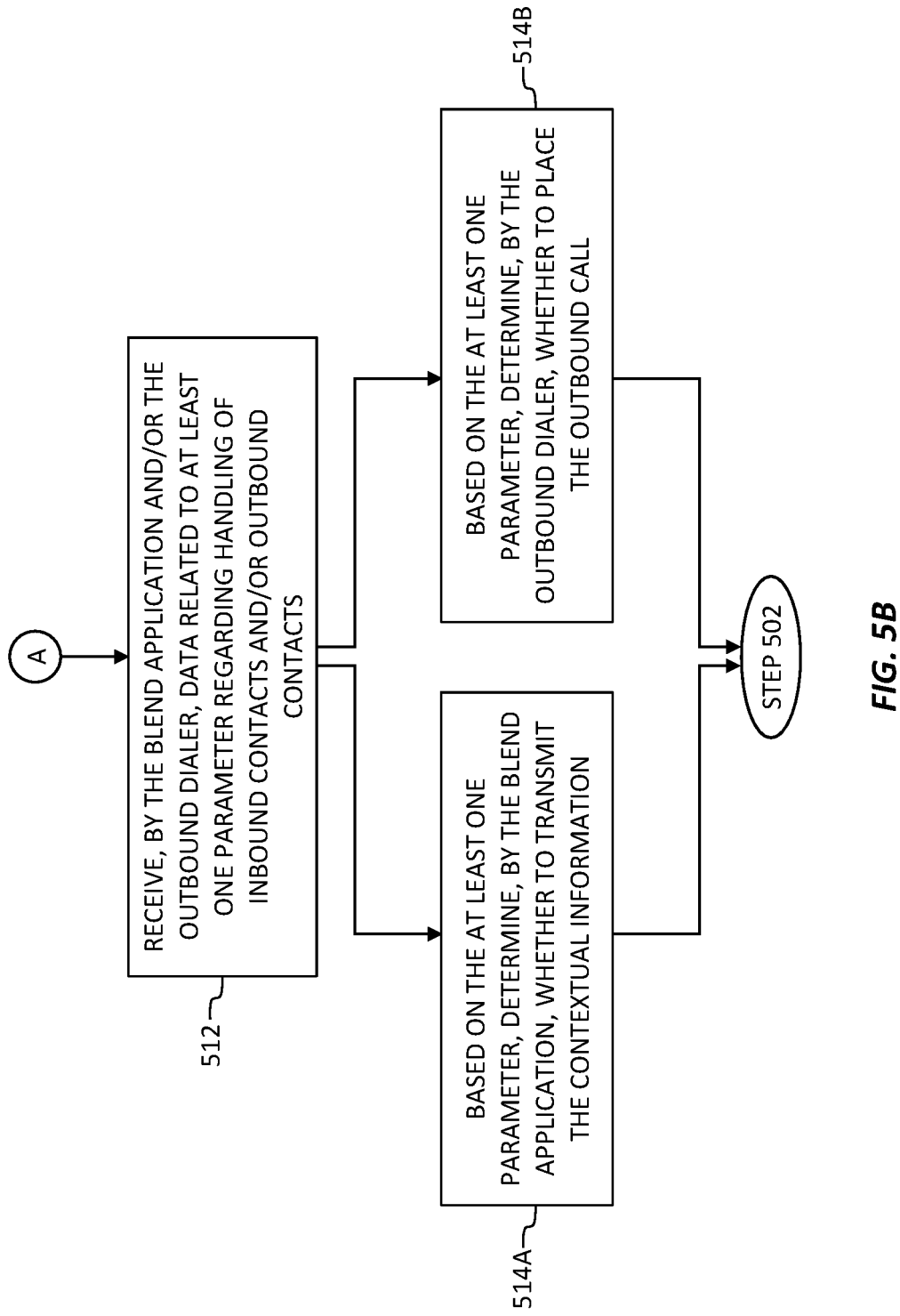

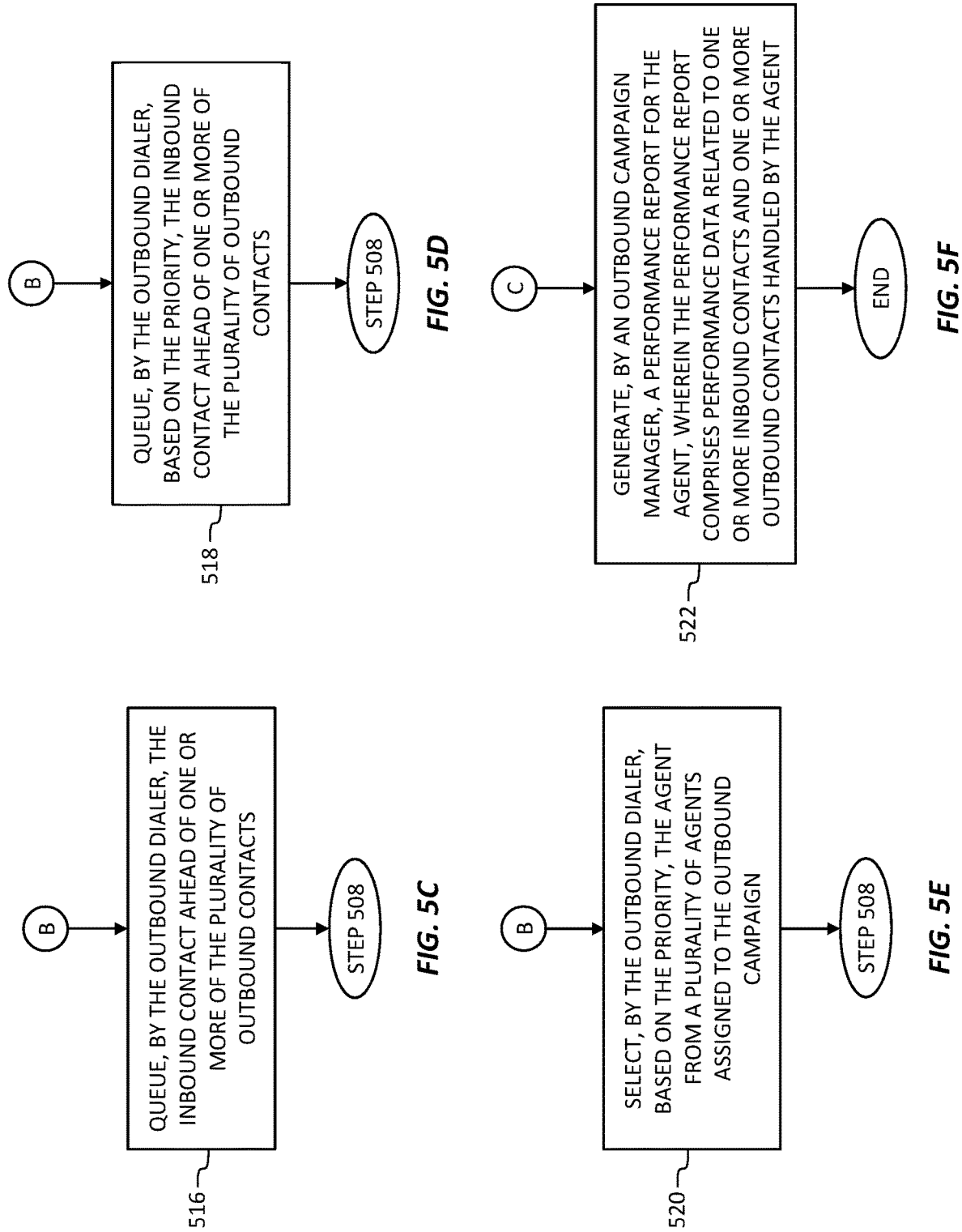

SYSTEMS AND METHODS FOR ASSIGNING CONTACTS IN A BLENDED CONTACT CENTER

BACKGROUND

The present disclosure relates generally to operation of a contact center, and, more particularly, to improved handling of contacts in a blend environment.

In a contact center, optimizing use of each resource's time is of prime importance. Blended contact centers that handle inbound (incoming) and outbound (outgoing) operations often require resources to handle outbound contacts when a volume of inbound contacts decreases, and vice versa (referred to herein as a blend environment), to maintain a steady workload for the resources within the contact center. Inbound and outbound campaigns are generally kept separate, with each resource typically being associated with or assigned to either an inbound campaign or an outbound campaign. If the resource wishes to change the type of contacts he or she is handling, the resource's campaign assignment must be switched. For example, if a resource assigned to an outbound campaign wishes to begin handling inbound contacts, he or she would need to switch assignments from the outbound campaign to the inbound campaign. Such switching between outbound and inbound campaigns may occur automatically or manually, but in either case, each reassignment of a resource causes a small delay. Resources across the contact center may switch campaigns multiple times per shift, which may result in a decrease in productivity and can negatively impact overall contact center performance. In addition, because performance reports are typically campaign-based, it can be difficult for supervisors to obtain a complete picture of resource performance in a blend environment.

BRIEF SUMMARY

One aspect of the present disclosure relates to a method for assigning contacts in a contact center. The method includes extracting, by a blend application, contextual information related to an inbound contact received at a first port, and when the contextual information indicates that a customer associated with the inbound contact has requested an agent interaction, transmitting, by the blend application, the contextual information to an outbound dialer. The method further includes placing, by the outbound dialer, an outbound call from a second port to the first port; automatically patching, by the outbound dialer, the second port with a third port that is associated with an agent assigned to an outbound campaign; and connecting, by the outbound dialer, a customer device associated with the inbound contact to a device associated with the agent, wherein the agent remains assigned to the outbound campaign.

Another aspect of the present disclosure relates to a system for assigning contacts in a contact center. This system includes a memory device, storing executable instructions, and a processor in communication with the memory device. In particular, the processor, when executing the executable instructions, implements a blend application and an outbound dialer, in which the blend application when implemented extracts contextual information related to an inbound contact received at a first port and when the contextual information indicates that a customer associated with the inbound contact has requested an agent interaction, transmits the contextual information to the outbound dialer. The outbound dialer when implemented places an outbound call from a second port to the first port; automatically patches the second port with a third port that is associated with an agent assigned to an outbound campaign; and connects a customer device associated with the inbound contact to a device associated with the agent, wherein the agent remains assigned to the outbound campaign.

A further aspect of the present disclosure relates to another method for assigning contacts in a contact center. The method includes extracting, by a blend application, contextual information related to an outbound contact associated with a first port, and transmitting, by the blend application, the contextual information to an automated call distributor (ACD). The method further includes placing, by the ACD, an inbound call from the first port to a second port; automatically patching, by the ACD, the second port with a third port that is associated with an agent assigned to an inbound campaign; and connecting, by the ACD, a customer device associated with the outbound contact to a device associated with the agent, wherein the agent remains assigned to the inbound campaign.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein:

FIGS. 5A-5F are flowcharts of exemplary methods for assigning contacts in a contact center in accordance with one aspect of the present disclosure.

DETAILED DESCRIPTION

Figure 1:
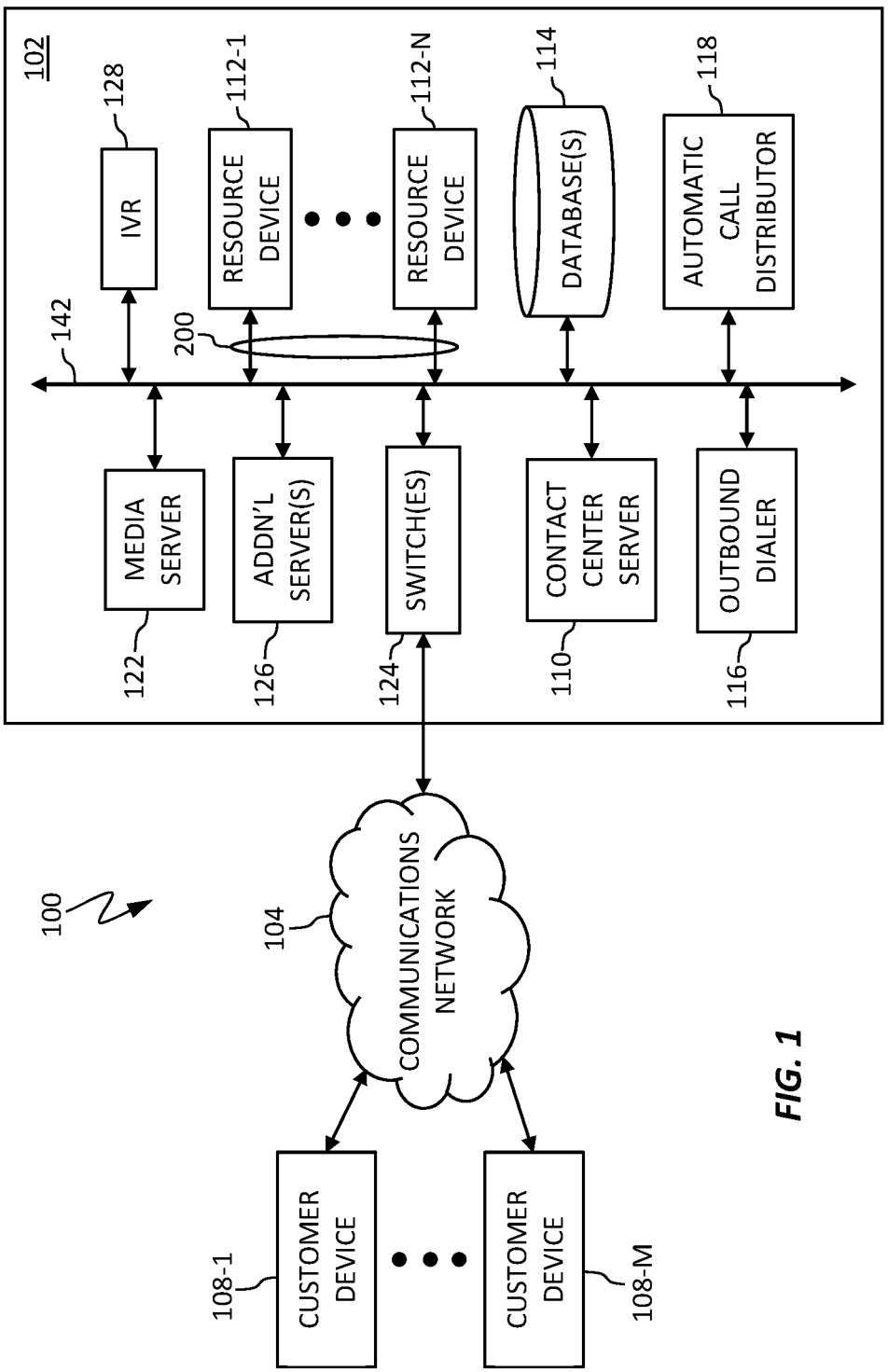
FIG. 1 illustrates a communications system architecture in accordance with principles of the present disclosure.

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

The term "communications channel" as used herein may correspond to a physical channel (e.g., a data path across a communications network that includes a plurality of nodes and interconnecting wired or wireless communications links), a logical channel (e.g., a protocol-dependent communications modality), and/or combinations thereof. It should also be appreciated that different communications channels may carry one or more media types. For instance, one communications channel may be capable of carrying first and second media types (e.g., voice and data) and a second communications channel may be capable of carrying only one of those media types (e.g., data). In such an example, the communications channels do not necessarily carry mutually exclusive media types. In another example, one communications channel may carry one media type (e.g., video, which is a combination of image and voice) and another communications channel may carry a different media type (e.g., data). A communications channel may also include data exchanges between different modules, or functionality blocks, of a single application operating on a device, computer, or computer system and/or intra-process or inter-process exchanges of data between different software applications operating on the same device, computer, or computer system.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communication may be by way of any communications medium or mode such as, but not limited to, a telephone call, email, instant message, web chat, and the like. The terms "user" and "customer" denote a party external to the contact center. A user or customer may include, for example, a person having a commercial relationship with the contact center or with a business represented by the contact center.

The terms "determine," "calculate," and "compute," and variations thereof, as used herein, are used interchangeably and include any type of methodology, process, mathematical operation or technique.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP). One or more embodiments of the present disclosure may utilize Web Real-Time Communications (WebRTC). WebRTC represents an ongoing effort to develop industry standards for integrating real-time communications functionality into web clients, such as web browsers or mobile apps or desktop apps, to enable direct interaction with other web clients or apps. This real-time communications functionality is accessible by web or app developers via standard markup tags, such as those provided by version 5 of the Hypertext Markup Language (HTML5), and client-side scripting Application Programming Interfaces (APIs) such as JavaScript APIs. WebRTC provides built-in capabilities for establishing real-time video, audio, and/or data streams in both point-to-point interactive sessions and multi-party interactive sessions. The WebRTC standards continue to be jointly developed by the World Wide Web Consortium and the Internet Engineering Task Force.

FIG. 1 shows an exemplary embodiment of a communications system 100 according to the present disclosure. The communications system 100 may comprise a communications network 104 connecting a contact center 102 to one or more customer communication devices 108-1 to 108-M, where M is an integer, M≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communications medium or mode or collection of communications media and/or modes and may use any type of protocols to transport messages between endpoints. The communications network 104 may be packet-switched and/or circuit-switched and may include wired and/or wireless technologies.

The contact center 102 may comprise, for example, a central contact center server 110, a media server 122, one or more additional servers 126, an Interactive Voice Response (IVR) unit or system 128, one or more switches 124, a set of one or more data stores or databases 114, an outbound dialer 116, and an automated call distributor (ACD) 118. The additional server(s) 126 may include, for example, a voice portal (not shown), a video call server, an email server, and the like. The database(s) 114 may contain contact-related or customer-related information and other information that may enhance the value and efficiency of contact processing, as described herein. Some or all of the components of the contact center 102 may be interconnected by an internal network 142 such as a local area network (LAN) or wide area network (WAN). One or more of the components of the contact center 102 may also be connected via one or more optional communications links (not shown) to one or more other components of the contact center 102.

Although several functions are depicted in FIG. 1 as separate servers and/or applications that are co-located with one another, it should be appreciated that this particular configuration of components is not required. For example, some or all of the functions depicted in the contact center 102 may be co-hosted and/or co-resident on a single server and/or processor (e.g. the contact center server 110), and/or two or more of the components of the contact center 102 may be distributed and connected to one another over the communications network 104, in which the communications between these components may be secured with tunneling protocols or a Virtual Private Network (VPN; not shown). In addition, although one central contact center server 110 is depicted in FIG. 1, two or more servers (not shown) may be provided in a single contact center 102 or across multiple separate LANs 142 owned and operated by a single enterprise but separated by the communications network 104. Likewise, the contact center 102 may comprise two or more media servers 122, IVR systems 128, etc. In configurations where the contact center 102 includes two or more of the same component, each one may comprise similar functionality but may be provisioned for providing its features to only a subset of all contact center users.

A contact or customer associated with a customer communication device 108 may utilize the device 108 to generate and transmit a communication, such as a telephone call, a video phone call, an email message, an instant message (IM), a Short Message Service (SMS) message, etc., over the communications network 104, which is received as a contact at the contact center 102. The contact center 102 may further comprise one or more boundary devices (not shown), which may include the functionality of one or more of a switch, a computer-telephony integration (CTI) interface, a SIP gateway, a security gateway, a firewall, a router, a session border controller (SBC), or the like. A boundary device comprising a SIP gateway may, for example, connect with one or more SIP trunks from the communications network 104 and split incoming aggregate SIP traffic into individual SIP sessions and aggregate the individual outbound SIP sessions. The boundary device may be implemented as hardware such as via an adjunct processor or as a chip in the contact center server 110.

For each contact received at the contact center 102, a contact object may be instantiated. The contact object may comprise one or more variables, functions, and data structures that represent the contact and may also comprise a number of attributes, which are assigned values based on its corresponding contact. Each contact object may be distributed to one or more of a plurality of resource communication devices 112-1 to 112-N, wherein N is an integer, N≥1 (referred to collectively herein as a resource communication device 112). Each resource communication device 112 is associated with a processing resource of the contact center 102. The resources may comprise automated resources (e.g., processors, servers, or the like), human resources utilizing communication devices (e.g., human agents utilizing a computer, telephone, laptop, etc.), or any other resource known to be used in contact centers. In some embodiments, contact objects may be assigned to the IVR system 128, a voice portal (not shown), an automated text-chat engine (not shown), or other automated resource of the contact center 102 for customer service processing prior to or simultaneously with assigning the contact object to a human resource. For example, the voice portal and the IVR system 128 may work together to provide IVR services to the contacts.

Each resource communication device 112 may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communication device, and/or any other suitable communication device. These packet-switched devices may be SIP compatible. The resource communication device 112 may also comprise a circuit-switched device that corresponds to one of a set of internal extensions and may include, for example, wired and wireless telephones, voice messaging and response units, traditional computer telephony adjuncts, and/or any other suitable communication device. Each resource may use an associated resource communication device 112 to receive an inbound contact initiated from a customer communication device 108 and/or to initiate an outbound communications session with a customer communication device 108, such as via a callback mechanism, outbound call, etc. In the case of an automated resource, the resource communication device may be software comprising executable instructions that allow the automated resource to send and receive information. Inbound and outbound contacts are handled in conjunction with the one or more switches 124, as described in more detail below.

Although some embodiments are discussed with reference to a client-server architecture, it is to be understood that the principles of the present disclosure apply to other network architectures. For example, the present disclosure applies to peer-to-peer networks, such as those envisioned by SIP or WebRTC. In the client-server model or paradigm, network services and the programs used by end users to access the services are described. The client side provides a user with an interface for requesting services from the network, and the server side is responsible for accepting user requests for services and providing the services transparent to the user. By contrast, in the peer-to-peer model or paradigm, each networked host runs both the client and server parts of an application program. Additionally, the disclosure does not require the presence of packet- or circuit-switched networks.

The contact center server 110 may include, for example, Avaya Inc.'s Operational Analyst™ (OA) with On-Line Analytical Processing (OLAP) technology and/or a Call Management System (CMS) or other suitable systems that gather contact records and contact-center statistics for use in contact center management. Contact objects may be received by the contact center server 110, and at least one work item may be generated for each contact object. The format of each work item may depend upon the capabilities of the customer communication device 108 and the format of the communication. In particular, work items are logical representations within the contact center 102 of work to be performed in connection with servicing a particular contact received at or generated by the contact center 102. The contact may include a work item that represents a request for an interaction with a resource of the contact center 102. The contact center server 110 may include a work assignment and routing application (not shown) that assigns and routes contacts to resources. Resources may be selected using skill-based assignment, in which resources are assigned to one or more skill groups and contacts are assigned to resources based on a comparison of the resource skill(s) required to service the contact and the skillset(s) of each resource. In an attribute-based contact center, such as a contact center using the Avaya Oceana® Solution, contacts are assigned to a resource based on matches between a plurality of individual attributes of the contact and the resource. Assignment and routing of contacts in queue-based and queueless contact centers are described in more detail in U.S. Pat. Nos. 8,234,141 and 8,634,543, the content of each of which is hereby incorporated herein by reference in its entirety.

With reference to FIG. 1, following assignment of an inbound contact to a resource or initiation of an outbound contact, the customer communication device 108 associated with the contact is connected with a respective resource communication device 112 associated with the resource via one or more communications lines or channels 200 (referred to herein as a customer communications channel). The customer communications channel 200 may be established over a common network 104, as shown in FIG. 1. The contact center server 110 may comprise a channel controller (not shown) that is configured to manage the utilization of the various communications channels of the contact center 102, including the customer communications channel 200. The channel controller may comprise, for example, a set of instructions stored in a computer memory that, when executed by a processor, enable the contact center 102 to operate as a multichannel contact center. The term "multichannel" may refer to a contact center 102 having a capability to communicate with a single customer using multiple different channels of communication. Interactions between the customer and a resource of the contact center 102 may occur on several occasions over one or more days and may take place via one or more communications channels using different communications modes (e.g., email, web chat, voice call, etc.) and/or media types (e.g., voice only, voice and video, etc.). The channel controller (not shown) may logically group or associate the interactions so that the work assignment/routing application views the multiple interactions as a single interaction. The channel controller will then route media received via the different channels and/or modes to the same resource communication device 112, thereby allowing the resource to interact with the customer via all applicable communications channels and/or modes. Multiple interactions may be grouped together to form a customer journey reflecting the customer's overall interaction with the contact center 102.

In some embodiments, the interaction may be a WebRTC communication between the resource and customer. To establish a WebRTC interactive flow (e.g., a real-time video, audio, and/or data exchange), two WebRTC clients may retrieve WebRTC-enabled web applications, such as HTML5/JavaScript web applications, from a WebRTC application server. Through the web applications, the two WebRTC clients then engage in dialogue for initiating a peer connection over which the WebRTC interactive flow will pass. The initiation dialogue may include a media negotiation used to reach an agreement on parameters that define characteristics of the WebRTC interactive flow. Once the initiation dialogue is complete, the WebRTC clients may then establish a direct peer connection with one another, and may begin an exchange of media and/or data packets transporting real-time communications. The peer connection between the WebRTC clients typically employs the Secure Real-time Transport Protocol (SRTP) to transport real-time media flows, and may utilize various other protocols for real-time data interchange. Dedicated mobile or desktop WebRTC enabled apps use similar interaction dialogues and techniques to establish media flows.

Many contact centers that handle incoming and outgoing contacts require their resources to work in a blend environment. While resources may be required to handle both inbound and outbound contacts, each resource is typically associated with or assigned to either an inbound campaign or an outbound campaign, as contact centers generally keep the two operations separate. For example, conventional contact centers may include a standalone outbound dialer that controls connection of outbound calls with a plurality of resource communication devices connected to dedicated outbound lines and a standalone ACD that controls connection of inbound calls with a plurality of resource communication devices connected to dedicated inbound lines. In order for a resource assigned to the outbound campaign to begin handling inbound contacts, the resource's assignment must be switched from the outbound campaign to the inbound campaign. For example, the resource's communication device may be disconnected from a dedicated outbound line and connected to a dedicated inbound line. The requirements are the same for a resource assigned to the inbound campaign who wishes to begin handling outbound contacts.

While switching of the resource's assignment between the outbound and inbound campaigns may occur automatically or manually, reassignment of each resource consumes resource time and contact center resources. Each resource within the contact center may switch campaigns multiple times per shift, and when considered across all of the resources within a contact center, reassignment of resources can translate into substantial delays and reduction in overall contact center performance. In addition, reports related to resource performance are typically tied to the campaign to which the resource is assigned. A supervisor attempting to evaluate a resource assigned to, for example, the inbound campaign, will generally receive a report that lists metrics related only to the inbound contacts handled by that resource during a particular review period. If the resource also handled outbound contacts during the review period, the report will not include metrics related to the outbound contacts, such that the report may provide an incomplete representation of the resource's performance. As the resource's pay, promotion potential, rewards/incentives, and the like often depend on his or her performance reviews, it is important for supervisors to have access to a single, comprehensive report that provides a complete picture of the resource's performance.

Systems and methods according to the present disclosure solve these problems by providing a blend application that monitors inbound and outbound contacts in a contact center and provides improved handling of inbound and outbound contacts without the need to switch a campaign assignment of the resources in the contact center. For example, the blend application allows a resource assigned to an outbound campaign to begin handling inbound contacts without changing his or her assignment to the inbound campaign and vice versa. Because the resource remains assigned to one campaign, time and resources may be saved, as compared to a conventional system that requires switching and reassignment of resources between inbound and outbound campaigns. In addition, systems and methods according to the present disclosure generate a single performance report that accurately reflects the resource's performance for all contacts, inbound and outbound, that were handled by the resource during the review period.

Figure 2:
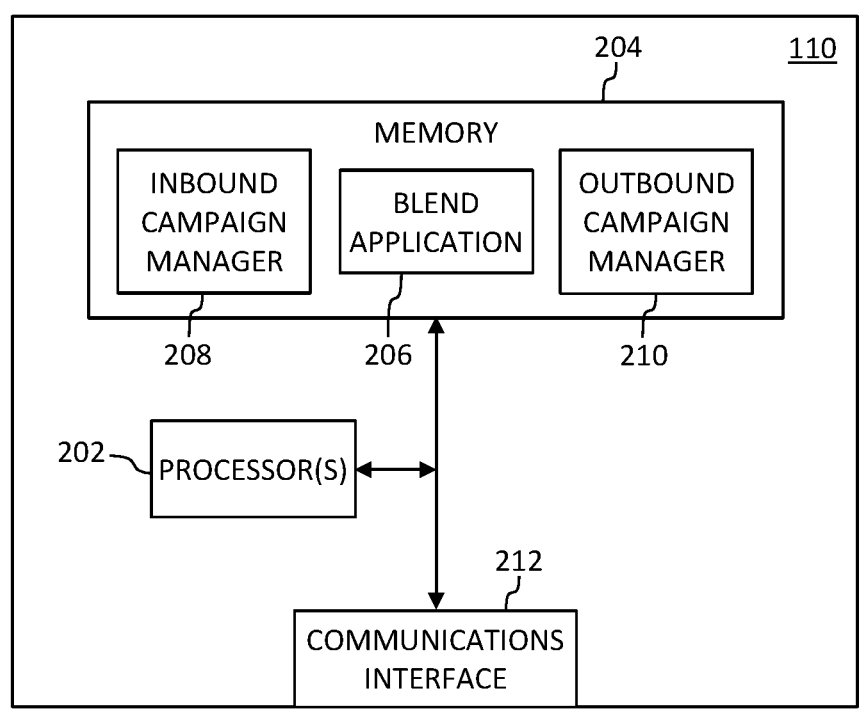
FIG. 2 illustrates aspects of a contact center server in accordance with principles of the present disclosure.

FIG. 2 illustrates some aspects of a contact center server 110 in accordance with principles of the present disclosure. The contact center server 110 may comprise one or more processors 202 coupled to a memory 204, which may store one or more applications or data, including a blend application 206, an inbound campaign manager 208, and an outbound campaign manager 210. The contact center server 110 may communicate, via a communications interface 212, with one or more elements in the contact center 102, as described herein, e.g., via the internal network 142. Although several functions are depicted in FIG. 2 as residing on the contact center server 110, it should be appreciated that one or more of the functions may reside on one or more separate servers (not shown). In addition, one or more of the functions depicted in FIG. 1 (e.g., the outbound dialer 116 and/or the ACD 118) may be co-hosted and/or co-resident on the contact center server 110.

Figure 3:
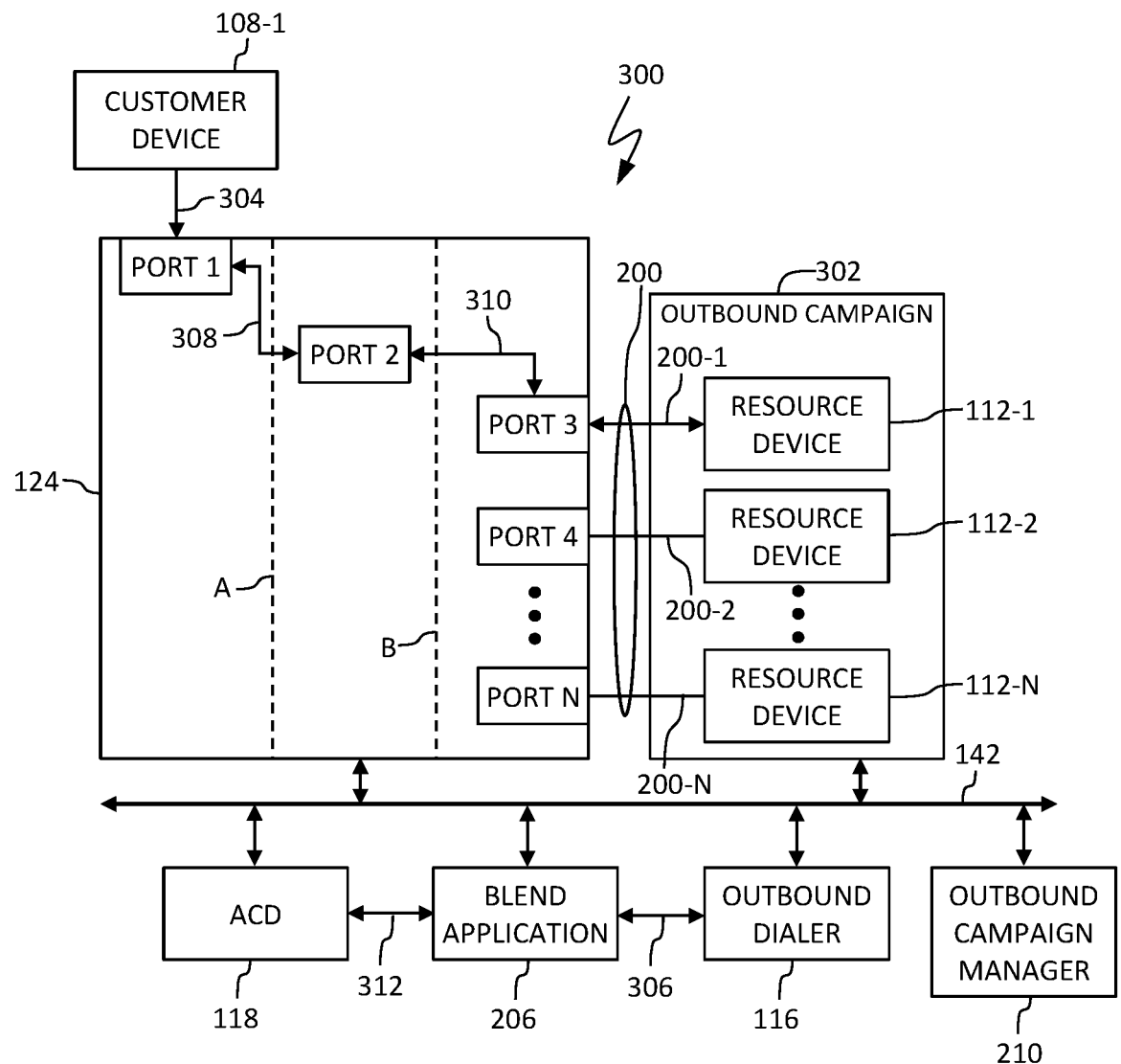
FIG. 3 is a schematic diagram depicting an interaction in accordance with the present disclosure.
Figure 4:
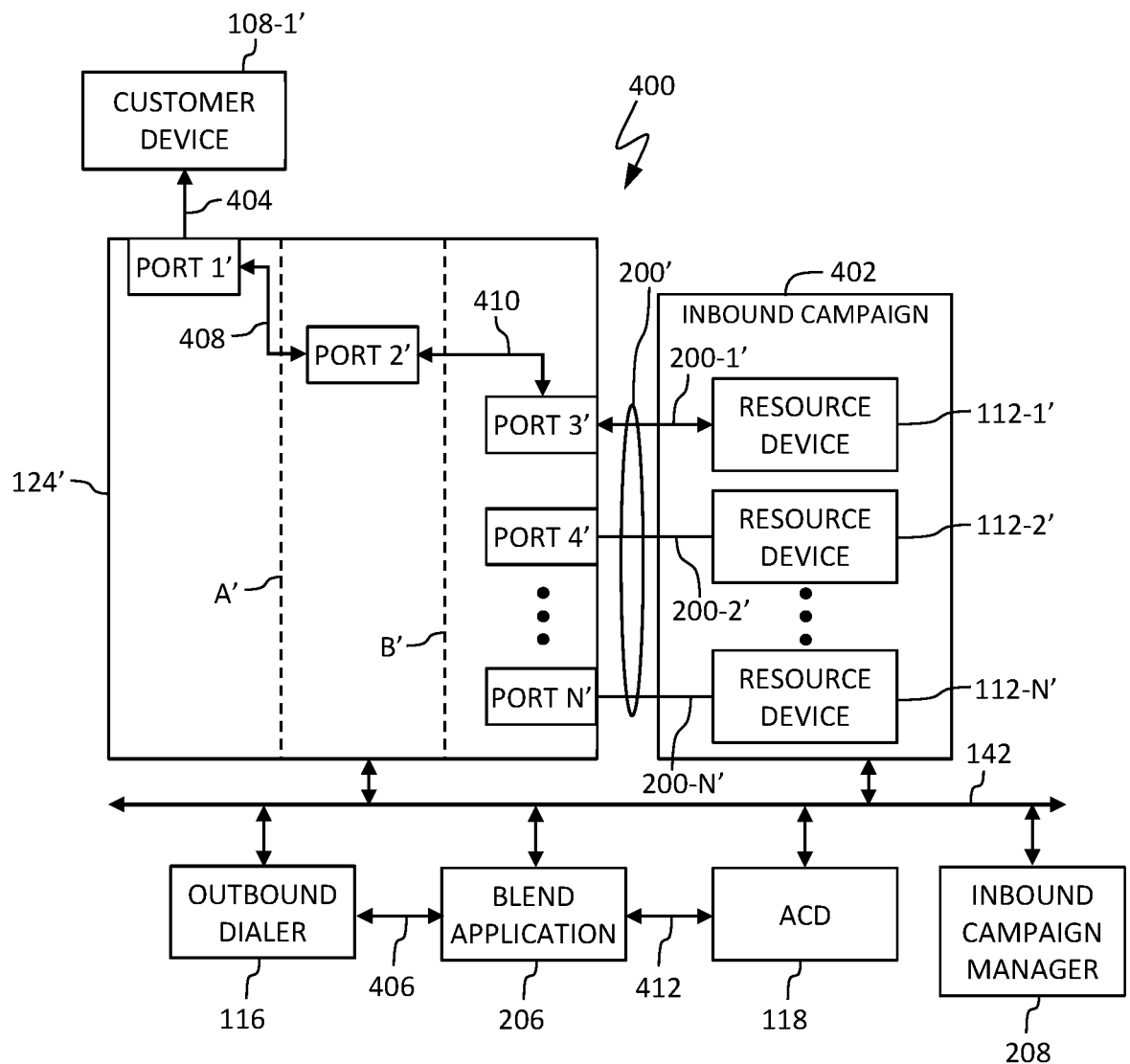
FIG. 4 is a schematic diagram depicting another interaction in accordance with the present disclosure.

FIGS. 3 and 4 provide schematic diagrams of exemplary interactions within a contact center, e.g., the contact center 102 of FIG. 1, in accordance with the present disclosure, in which some components of the contact center 102 have been removed or simplified to illustrate other aspects of the system in detail. With reference to FIGS. 1-3, a contact center 102 in accordance with the present disclosure may comprise a system 300 that includes a plurality of resource communication devices 112-1 to 112-N, wherein N is an integer (N≥1). The resources (not shown) associated with the resource communication devices 112-1 to 112-N are associated with or assigned to an outbound campaign 302. The system 300 may further comprise one or more switches 124 and a plurality of ports, Port 1 to Port N, wherein N is an integer (N≥1). Each resource communication device 112 is associated with or assigned to a respective port, e.g., Port 3 to Port N in FIG. 3. In some examples, Port 1 to Port N may all be located on a single switch. In other examples, Port 1 to Port N may be located on two or more different switches, as indicated by dashed lines A and B. In some instances, a single switch may include some ports that are dedicated to handling inbound contacts and other ports that are dedicated to handling outbound contacts. In other instances, the system 300 may comprise multiple switches, in which all ports on each switch are dedicated to handling either inbound or outbound contacts.

The communications lines or channels 200 between the resource communication devices 112 in FIG. 3 and their associated ports may generally be dedicated to handling outbound contacts. Each resource communication device 112 may have a respective semi-permanent or "nailed" connection 200-1 to 200-N that may be established, for example, when the respective resource logs in at the beginning of his or her shift at the contact center 102. Each connection 200-1 to 200-N may remain in place until, for example, the resource logs out at the end of his or her shift at the contact center 102. As is known in the art, an outbound dialer 116 in communication with the switch 124 and the resource communication devices 112 may initiate a plurality of outbound contacts by placing outbound calls to customer devices (not shown) for connection with the resource communication devices 112.

In accordance with the present disclosure, a blend application 206 is in communication with the outbound dialer 116 and an ACD 118, as shown in FIG. 3. The blend application 206 may communicate with the outbound dialer 116 and the ACD 118 via the internal network 142 or via a direct link 306, 312, respectively. An inbound contact 304 from a customer communication device 108-1 may be received at a first port, e.g., Port 1, of the switch 124. The blend application 206 may monitor for new inbound contacts, e.g., via the ACD 118, and may extract contextual information related to the inbound contact 304. The contextual information may include, but is not limited to, a port identifier or port number of Port 1 on which the inbound contact 304 is received; information related to the customer communication device 108-1; and information related to a customer associated with the customer communication device 108-1. Device-related information may comprise, for example, a device identifier (e.g., a media access control (MAC) address), a phone number, an Internet Protocol (IP) address, a device type, media capabilities, and the like. Customer information may comprise, for example, contact information (e.g., a customer name, physical address, email address, and the like), preferred language, and information about past interactions by the customer with the contact center 102 (e.g., reason for the interaction, outcome of the interaction, feedback from the customer about the interaction, and the like). The customer information may further include a priority associated with the customer, e.g., a "high" priority customer who has paid for a premium service plan.

The contextual information may further comprise information related to the current inbound contact 304, such as a reason why the customer initiated the current inbound contact 304 with the contact center 102 (e.g., purchasing a product/service, questions about a bill, etc.) and a request to interact with a resource of the contact center 102 (also referred to as an agent interaction). At least a portion of the contextual information may be extracted from a customer profile that may be maintained, for example, in the database(s) 114 and may be associated with the customer, e.g., based on the customer communication device 108-1. Alternatively, or in addition, at least a portion of the contextual information may be provided to the blend application 206 by the IVR system 128 (see FIG. 1). In some examples, the customer associated with the inbound contact 304 may initially interact with the IVR system 128 upon receipt of the inbound contact 304 at the contact center 102, and the IVR system 128 may obtain at least a portion of the contextual information based on this initial interaction.

When the contextual information extracted by the blend application 206 indicates that the customer associated with the inbound contact 304 has requested an agent interaction, the inbound contact 304 may be, for example, placed on hold or placed in an inbound queue (not shown). The blend application 206 may then transmit, via the internal network 142 or the direct link 306, the contextual information to the outbound dialer 116. Using the port number of Port 1, the outbound dialer 116 may place an internal (outbound) call 308 from a second port, e.g., Port 2, to Port 1 where the inbound contact 304 currently resides. The outbound dialer 116 may then automatically implement a patch 310 between Port 2 and a third port, e.g., Port 3, that is associated with one of the resources assigned to the outbound campaign 302. Ports 1-3 may be located on a single switch or on two or more different switches, as indicated by dashed lines A and B. In some instances, e.g., when Port 2 and Port 3 are on the same switch, the patch 310 may be implemented internally via software, alone or in combination with hardware. In other instances, e.g., when Port 2 and Port 3 are on different switches, the patch 310 may involve use of, for example, a patch panel (not shown) between the switches. In further instances, there may be one or more intervening switches between the port on which the inbound contact 304 is received and the port associated with the resource, in which case one or more additional patches and/or calls (not shown) may be implemented to effect a connection between the ports.

The customer communication device 108-1 associated with the inbound contact 304 may then be connected to a resource communication device, e.g., resource communication device 112-1, of the resource associated with Port 3 via the associated connection 200-1 between the resource communication device 112-1 and Port 3, after which the customer associated with the inbound contact 304 and the resource may begin to interact. The resource's assignment to the outbound campaign 302 remains unchanged throughout the interaction with the customer. Following wrap-up of the inbound contact 304, the call 308 may be terminated, and the patch 310 may be terminated/disabled.

In some instances, some operations of the blend application 206 may be triggered only when certain criteria are met. For example, with reference to FIGS. 1 and 3, the blend application 206 may receive, from the outbound dialer 116 and/or the ACD 118, data related to at least one parameter regarding handling of inbound and/or outbound contacts within the contact center 102. The one or more parameters regarding handling of inbound contacts may comprise, for example, a number of queued inbound contacts, a predicted wait time for a queued inbound contact to be serviced by a resource, a resource utilization or occupancy, a call abandonment rate, customer satisfaction, and the like. The one or more parameters regarding handling of outbound contacts may comprise, for example, a resource utilization/occupancy. Respective predetermined minimum or maximum levels and/or predetermined ranges for one or more of the parameters may be set out in one or more service level agreements or other type of performance measurement agreements and/or by one or more contact center rules and/or goals. For example, an agreement and/or rule/goal may specify respective maximum levels for the number of queued inbound contacts, the predicted wait time, the call abandonment rate, and other parameters. The agreement and/or rule/goal may also set minimum and maximum levels for resource utilization/occupancy for all resources within the contact center 102.

Based on the data related to the parameter(s) regarding handling of inbound and/or outbound contacts, the blend application 206 may determine whether to begin the process described above to facilitate connection of inbound contacts with resources assigned to the outbound campaign 302. In one example, the blend application 206 may determine, based on the data, whether to extract and transmit the contextual information to the outbound dialer 116. In another example, the blend application 206 may continually extract the contextual information and may determine, based on the data, whether to transmit the contextual information to the outbound dialer 116. This determination may be based, at least in part, on whether a current value for one or more of the parameters is above or below a respective predetermined minimum or maximum level and/or falls outside a predetermined range for the parameter(s). For example, if the number of inbound contacts is high, the number of queued contacts and/or the predicted wait time may exceed a predetermined maximum level, which may also cause the call abandonment rate to exceed a predetermined maximum level. The ACD 118 may transmit data related to one or more of these parameters to the blend application 206, and in response, the blend application 206 may begin extracting and transmitting contextual information to the outbound dialer 116 so that a portion of the inbound contacts may be diverted to resources assigned to the outbound campaign 302, as described herein. Likewise, if outbound call volume is low, the utilization/occupancy of resources assigned to the outbound campaign 302 may fall below a predetermined minimum level, and the blend application 206 may begin extracting and transmitting contextual information to the outbound dialer 116 in order to increase the utilization/occupancy of these resources.

In some examples, following commencement of operation of the blend application 206, the blend application 206 may optionally continue to receive data from the outbound dialer 116 and/or the ACD 118 related to the one or more parameters regarding handling of inbound and/or outbound contacts, and based on the data, the blend application 206 may determine whether to cease operation, i.e., to stop extracting and transmitting contextual information to the outbound dialer 116. This determination may be based, at least in part, on whether the current value for one or more of the parameters now meets the respective predetermined level(s) and/or falls within the predetermined range(s). For example, if the number of inbound contacts decreases, the data transmitted by the ACD 118 may indicate that the number of queued contacts, the predicted wait time, and/or the call abandonment rate have dropped back down below the respective predetermined (maximum) levels. The blend application 206 may then cease extraction and transmission of contextual information to the outbound dialer 116, and the resources assigned to the outbound campaign 302 may resume handling only outbound contacts.

Alternatively or in addition, in other instances, the outbound dialer 116 may implement operations to connect the inbound contact 304 to a resource assigned to the outbound campaign 302 only when certain criteria are met. The blend application 206 may continually extract and transmit contextual information related to inbound contacts to the outbound dialer 116, and based on data related to at least one parameter regarding handling of inbound and/or outbound contacts, the outbound dialer 116 may determine whether to begin the process described above to connect the inbound contact 304 to a resource assigned to the outbound campaign 302, i.e., whether to place the call 308 from Port 2 to Port 1, automatically implement the patch 310 between Port 2 and Port 3, and so on. The data may be transmitted to the outbound dialer 116 by the blend application 206, the ACD 118, and/or other component within the contact center 102, and the parameter(s) may be substantially as described above with respect to the blend application 206. The outbound dialer 116 may then make the determination to begin connecting inbound contacts based, at least in part, on whether the current value for one or more of the parameters is above or below the respective predetermined minimum or maximum levels and/or falls outside the predetermined range for the parameter(s). The outbound dialer 116 may cease operations to connect inbound contacts to resources assigned to the outbound campaign 302 when the current value for the one or more parameters meets the respective predetermined minimum or maximum levels and/or falls within the predetermined range for the parameter(s).

Inbound contacts to the contact center 102 may generally be given precedence over outbound contacts. For example, as part of the outbound campaign 302, the outbound dialer 116 may be programmed to place a certain volume of outbound calls to customer devices using known call pacing algorithms. When the blend application 206 transmits the contextual information related to the inbound contact 304 to the outbound dialer 116, the outbound dialer 116 may queue the inbound contact 304 ahead of one or more of the outbound calls.

In instances in which the contextual information related to the inbound contact 304 includes a priority, the priority may be taken into consideration by the outbound dialer 116 to determine handling of the inbound contact 304. For example, the outbound campaign 302 may comprise a plurality of outbound calls that are to be made, and the outbound dialer 116 may move the inbound contact 304 ahead of one or more of the outbound calls based on the priority. The priority associated with the inbound contact 304 may also trigger the outbound dialer 116 to select a particular resource from the plurality of resources assigned to the outbound campaign 302. In general, each resource assigned to an outbound campaign 302 is assigned to an outbound contact as the resource becomes available, with little or no consideration of how the skills of the resource match the skills required to service a particular outbound contact. In accordance with the present disclosure, the outbound dialer 116 may select, based at least in part on the priority associated with the inbound contact 304, a particular one of the resources assigned to the outbound campaign 302 by comparing the resource's skills to the skills required to service the inbound contact 304 and selecting a resource with a best match.

With reference to FIGS. 2 and 3, an outbound campaign manager 210 may communicate with the blend application 206 and the outbound dialer 116 to periodically generate performance reports for each resource. The assignment of the resources to the outbound campaign 302 remains unchanged, even while handling inbound contacts, such that the performance reports generated by the outbound campaign manager 210 include performance data related to all inbound and outbound contacts handled by the respective resources assigned to the outbound campaign 302.

In a conventional contact center system with a standalone outbound dialer, if a resource assigned to an outbound campaign wished to handle an inbound contact, the resource would be required to terminate a current connection, e.g., connection 200-1 in FIG. 3, and be released from the outbound campaign. The standalone outbound dialer would generally receive no information regarding inbound contacts and would play no role in assignment of inbound contacts to resources assigned to the outbound campaign. The resource would then be assigned to an inbound campaign and would be required to establish a new connection before he or she could begin handling inbound contacts. If the resource wished to go back to handling outbound contacts, he or she would have to go through the switching process again. All time required by the conventional system to switch the resource's campaign assignment is wasted, as this time could be spent by the resource servicing other contacts or performing other useful functions. In addition, each step requires a small portion of the contact center's computing resources, which must be expended repeatedly to switch the campaign assignment of each resource in the contact center, potentially multiple times per work shift. Furthermore, data related to handling of inbound and outbound contacts is generally kept separate in conventional contact center systems, such that the resource's supervisor may be able to view performance data related only to the outbound contacts handled by the resource. Based on this incomplete data, the resource's performance may appear deficient, which may result in loss of pay and/or other benefits.

The system 300 in accordance with the present disclosure provides the blend application 206, which monitors for new inbound contacts and facilitates assignment and connection, via the outbound dialer 116, of an inbound contact 304 with a resource communication device 112-1 of a resource who is assigned to the outbound campaign 302. The resource remains assigned to the outbound campaign 302 and his or her connection 200-1 remains in place, thereby saving time and resources and increasing overall productivity. In addition, because the resource is not required to change his or her campaign assignment, all performance data for the resource may be centralized, such that the performance reports generated by the outbound campaign manager 210 include performance data related to both inbound and outbound contacts handled by the resource.

With reference to FIGS. 1, 2, and 4, the blend application 206 may also be used to facilitate assignment of outbound contacts to resources assigned to an inbound campaign 402. Similar to FIG. 3, a contact center 102 in accordance with the present disclosure may comprise a system 400 that includes a plurality of resource communication devices 112-1' to 112-N', wherein N is an integer (N≥1). The resources (not shown) associated with the resource communication devices 112-1' to 112-N' are associated with or assigned to the inbound campaign 402. The system 400 may further comprise one or more switches 124' and a plurality of ports, Port 1' to Port N', wherein N is an integer (N≥1). Each resource communication device 112' may be assigned to a port, e.g., Port 3' to Port N'. Port 1' to Port N' may all be located on a single switch 124' or on two or more different switches 124', as indicated by dashed lines A' and B'. A single switch may include some ports that are dedicated to handling inbound contacts and other ports that are dedicated to handling outbound contacts and/or all ports on each switch may be dedicated to handling either inbound or outbound contacts.

The communications lines or channels 200' between the resource communication devices 112' and their associated ports may generally be dedicated to handling inbound contacts. Each resource communication device 112' may have a respective semi-permanent or "nailed" connection 200-1' to 200-N' that may be established, for example, when the respective resource logs in at the beginning of his or her shift at the contact center 102. The connections 200-1' to 200-N' may remain in place until, for example, the resource logs out at the end of his or her shift at the contact center 102. As is known in the art, an ACD 118 in communication with the switch 124' and the resource communication devices 112' may assign and route inbound contacts to the resource communication devices 112'.

In accordance with the present disclosure, a blend application 206 is in communication with an outbound dialer 116 and the ACD 118, as shown in FIG. 4. The blend application 206 may communicate with the outbound dialer 116 and the ACD 118 via the internal network 142 or via a direct link 406, 412, respectively. An outbound contact 404 is initiated between a customer communication device 108-1' and the contact center 102 (e.g., via the outbound dialer 116 or by another server 126 of the contact center 102; see FIGS. 1 and 3) at a first port, e.g., Port 1', of the switch 124'. The blend application 206 may monitor for new outbound contacts, e.g., via the outbound dialer 116, and may extract contextual information related to the outbound contact 404. The contextual information related to the outbound contact 404 may be substantially similar to the contextual information related to an inbound contact 304, as described above. For example, the contextual information related to the outbound contact 404 may include a port identifier or port number of Port 1' on which the outbound contact 404 is initiated; information related to the customer communication device 108-1'; and information related to a customer associated with the customer communication device 108-1'. The contextual information may also comprise information related to the current outbound contact 404, such as a reason for initiating the outbound contact 404 (e.g., as part of a specific outbound campaign). Some or all of the contextual information may be extracted from a customer profile and/or provided to the blend application 206 by the outbound dialer 116.

The blend application 206 may transmit, via the internal network 142 or the direct link 412, the contextual information to the ACD 118. Using the port number of Port 1', the ACD 118 may place an internal (inbound) call 408 from a second port, e.g., Port 2', to Port 1' where the outbound contact 404 currently resides. The ACD 118 may then automatically implement a patch 410 between Port 2' and a third port, e.g., Port 3', that is associated with one of the resources assigned to the inbound campaign 402. Ports 1-3' may be located on a single switch or on two or more different switches, as indicated by dashed lines A' and B'. In some instances, e.g., when Port 2' and Port 3' are on the same switch, the patch 410 may be implemented internally via software, alone or in combination with hardware. In other instances, e.g., when Port 2' and Port 3' are on different switches, the patch 410 may involve use of, for example, a patch panel (not shown) between the switches. In further instances, there may be one or more intervening switches between the port on which the outbound contact 404 is received and the port associated with the resource, in which case one or more additional patches and/or calls (not shown) may be implemented to effect a connection between the ports. In some examples, the inbound call 408 may be placed and/or the patch 410 may be implemented upon the ACD 118 being notified, e.g., by the blend application 206 and/or the outbound dialer 116, that the outbound contact 404 has been accepted, i.e., an outbound call is answered, a chat/message request is accepted, and the like.

The customer device 108-1' associated with the outbound contact 404 may then be connected to a resource communication device, e.g., resource communication device 112-1', of the resource associated with Port 3' via the associated connection 200-1' between the resource communication device 112-1' and Port 3', after which the customer associated with the outbound contact 404 and the resource may begin to interact. The resource's assignment to the inbound campaign 402 remains unchanged throughout the interaction. Following wrap-up of the outbound contact 404, the call 408 may be terminated, and the patch 410 may be terminated/disabled.

In some examples, some operations of the blend application 206 may be triggered only when certain criteria are met. For example, with reference to FIGS. 1 and 4, the blend application 206 may receive, from the outbound dialer 116 and/or the ACD 118, data related to at least one parameter regarding handling of inbound and/or outbound contacts within the contact center 102. The one or more parameters regarding handling of inbound contacts may comprise, for example, a resource utilization/occupancy. The one or more parameters regarding handling of outbound contacts may comprise, for example, a resource utilization/occupancy and a call abandonment rate. Respective predetermined minimum or maximum levels and/or predetermined ranges for these parameters may be established based on one or more contact center rules/goals and/or based on service level agreement(s) or other type of performance measurement agreement(s). For example, an agreement or rule/goal may specify minimum and maximum levels for resource utilization/occupancy for all resources within the contact center 102 and a maximum level for the call abandonment rate.

Based on the data related to the parameter(s) regarding handling of inbound and/or outbound contacts, the blend application 206 may determine whether to begin the process described above to facilitate connection of outbound contacts with resources assigned to the inbound campaign 402. In one example, the blend application 206 may determine, based on the data, whether to extract and transmit the contextual information to the ACD 118. In another example, the blend application 206 may continually extract the contextual information and may determine, based on the data, whether to transmit the contextual information to the ACD 118. This determination may be based, at least in part, on whether a current value for one or more of the parameters is above or below a respective predetermined minimum or maximum level and/or falls outside a predetermined range for the parameter(s). For example, if outbound call volume is high, the utilization/occupancy of resources assigned to the outbound campaign 302 may exceed a predetermined maximum level, which may also result in a call abandonment rate that exceeds a predetermined maximum level. The outbound dialer 116 may transmit data related to these parameters to the blend application 206, and in response, the blend application 206 may begin extracting and transmitting contextual information to the ACD 118 so that a portion of the outbound contacts may be diverted to resources assigned to the inbound campaign 402, as described herein.

In some examples, following commencement of operation of the blend application 206, the blend application 206 may optionally continue to receive data from the outbound dialer 116 and/or the ACD 118 related to the one or more parameters regarding handling of inbound and/or outbound contacts, and based on the data, the blend operation 206 may determine whether to cease operation, i.e., to stop extracting and transmitting contextual information to the ACD 118. This determination may be based, at least in part, on whether the current value for one or more of the parameters now meets the respective predetermined level(s) and/or falls within the predetermined range(s). For example, if the outbound call volume decreases, the data transmitted by the outbound dialer 116 may indicate that the utilization/occupancy of resources assigned to the outbound campaign 302 and the call abandonment rate have dropped back down below the respective predetermined maximum levels. The blend application 206 may then cease extraction and transmission of contextual information to the ACD 118, and the resources assigned to the inbound campaign 402 may resume handling only of inbound contacts.

Alternatively or in addition, in other instances, the ACD 118 may implement operations to connect the outbound contact 404 to a resource assigned to the inbound campaign 402 only when certain criteria are met. The blend application 206 may continually extract and transmit contextual information related to outbound contacts to the ACD 118, and based on data related to at least one parameter regarding handling of inbound and/or outbound contacts, the ACD 118 may determine whether to begin the process described above to connect the outbound contact 404 to a resource assigned to the inbound campaign 402, i.e., whether to place the call 408 from Port 2' to Port 1', automatically implement the patch 410 between Port 2' and Port 3', and so on. The data may be transmitted to the ACD 118 by the blend application 206, the outbound dialer 116, and/or other component within the contact center 102, and the parameter(s) may be substantially as described above. The ACD 118 may then make the determination to begin connecting outbound contacts based, at least in part, on whether the current value for one or more of the parameters is above or below the respective predetermined minimum or maximum levels and/or falls outside the predetermined range for the parameter(s). The ACD 118 may cease operations to connect outbound contacts to resources assigned to the inbound campaign 402 when the current value for the one or more parameters meets the respective predetermined minimum or maximum levels and/or falls within the predetermined range for the parameter(s).

In instances in which the contextual information related to the outbound contact 404 includes a priority, the priority may trigger the ACD 118 to select a particular resource from the resources assigned to the inbound campaign 402 to handle the outbound contact 404. As described above, outbound contacts are generally assigned to a resource based only on availability, with little or no consideration of the resource's skills. Based on a priority associated with the outbound contact 404, the ACD 118 may select a particular one of the resources assigned to the inbound campaign 402 by comparing the resource's skills to the skills required to service the outbound contact 404 and selecting a resource with a best match.

With reference to FIGS. 2 and 4, an inbound campaign manager 208 may communicate with the blend application 206 and the ACD 118 to periodically generate performance reports for each resource. The assignment of the resources to the inbound campaign 402 remains unchanged, even while handling outbound contacts, such that the performance reports generated by the inbound campaign manager 208 include performance data related to all inbound and outbound contacts handled by the respective resources assigned to the inbound campaign 402.

As described above with respect to FIG. 3, a standalone ACD in a conventional contact center system would generally receive no information regarding outbound contacts and would play no role in assignment of outbound contacts to resources assigned to the inbound campaign. Thus, a resource assigned to an inbound campaign who wishes to begin handling outbound contacts would be required to terminate a current connection, e.g., connection 200-1' in FIG. 4, and be released from the inbound campaign. The resource would then be assigned to an outbound campaign and would be required to establish a new connection before he or she could begin handling outbound contacts, all of which wastes time and resources. Furthermore, performance reports generated by a conventional inbound campaign manager generally contain only data related to handling of inbound contacts, which may provide an incomplete picture of the resource's overall performance.

The system 400 in accordance with the present disclosure provides the blend application 206, which monitors for new outbound contacts and facilitates assignment and connection, via the ACD 118, of an outbound contact 404 with a resource communication device 112-1' of a resource who is assigned to the inbound campaign 402. The resource remains assigned to the inbound campaign 402 and his or her connection 200-1' remains in place, thereby saving time and resources and increasing overall productivity. In addition, because the resource is not required to change his or her campaign assignment, all performance data for the resource may be centralized, such that the performance reports generated by the inbound campaign manager 208 include performance data related to both inbound and outbound contacts handled by the resource.

FIGS. 5A-5F and 6A-6D illustrate exemplary methods for assigning contacts in a contact center, in accordance with the present disclosure. The methods set out in FIGS. 5A-5F and 6A-6D may be performed all or in part by a processor of a system, e.g., by the processor 202 of the server 110 of FIGS. 1 and 2, that is in communication with a memory device, e.g., the memory 204, database(s) 114, and/or other computer-readable storage medium, and executes instructions stored in the memory device.

Figure 5A:
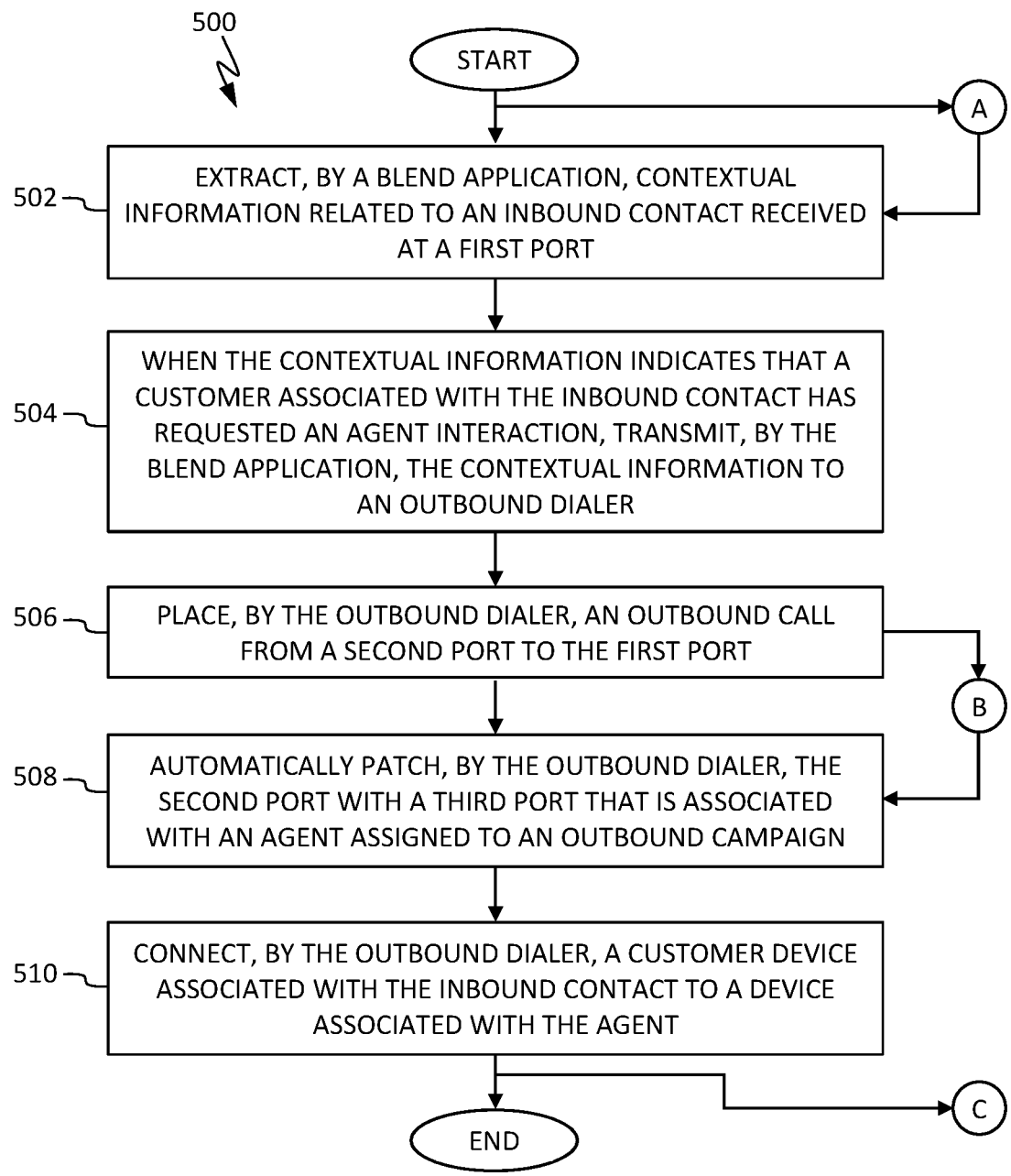

With reference to FIG. 5A, a method 500 for assigning contacts in a contact center begins at Step 502 in which a blend application may extract contextual information related to an inbound contact received at a first port. At Step 504, when the contextual information indicates that a customer associated with the inbound contact has requested an agent interaction, the blend application may transmit the contextual information to an outbound dialer. The outbound dialer may place an outbound call from a second port to the first port at Step 506, and at Step 508, the outbound dialer may automatically patch the second port with a third port that is associated with an agent assigned to an outbound campaign. At Step 510, the outbound dialer may connect a customer device associated with the inbound contact to a device associated with the agent, in which the agent remains assigned to the outbound campaign. The method 500 may then conclude.

FIG. 5B illustrates additional, optional functions that may be performed by the blend application and/or the outbound dialer. At Step 512, one or both of the blend application and the outbound dialer may receive, e.g., from the outbound dialer, the ACD, and/or one or more other components within the contact center 102, data related to at least one parameter regarding one or both of inbound contacts and outbound contacts. When the blend application receives the data, the blend application may determine at Step 514A, based on the at least one parameter, whether to transmit the contextual information to the outbound dialer in Step 504. When the outbound dialer receives the data, the outbound dialer may determine at Step 514B, based on the at least one parameter, whether to place the outbound call. Although Steps 512 and 514A/514B are depicted as occurring prior to or simultaneously with Step 502, it is understood that these Steps may also occur in between Steps 502 and 504 or simultaneously with Step 504.

FIGS. 5C-5E illustrate additional, optional functions that may be performed following transmission of the contextual information in Step 504 of FIG. 5A. In some examples as shown in FIG. 5C, the outbound campaign may further comprise a plurality of outbound contacts, and the method may optionally comprise queuing, by the outbound dialer, the inbound contact ahead of one or more of the plurality of outbound contacts at Step 516. In other examples as shown in FIGS. 5D and 5E, the contextual information may further comprise an indication of a priority of the inbound contact. When the outbound campaign further comprises a plurality of outbound contacts, the method may optionally comprise queuing, by the outbound dialer, based on the priority, the inbound contact ahead of one or more of a plurality of outbound contacts at Step 518 in FIG. 5D. As shown in FIG. 5E, the method may optionally comprise selecting, by the outbound dialer, based on the priority, the agent from a plurality of agents assigned to the outbound campaign at Step 520. Steps 516-520 may occur between Steps 506 and 508 of FIG. 5A or simultaneously with Step 506.

In further examples as shown in FIG. 5F, the method may further optionally comprise generating, by an outbound campaign manager, a performance report for the agent at Step 522, wherein the performance report comprises performance data related to one or more inbound contacts and one or more outbound contacts handled by the agent.

Figure 6A:
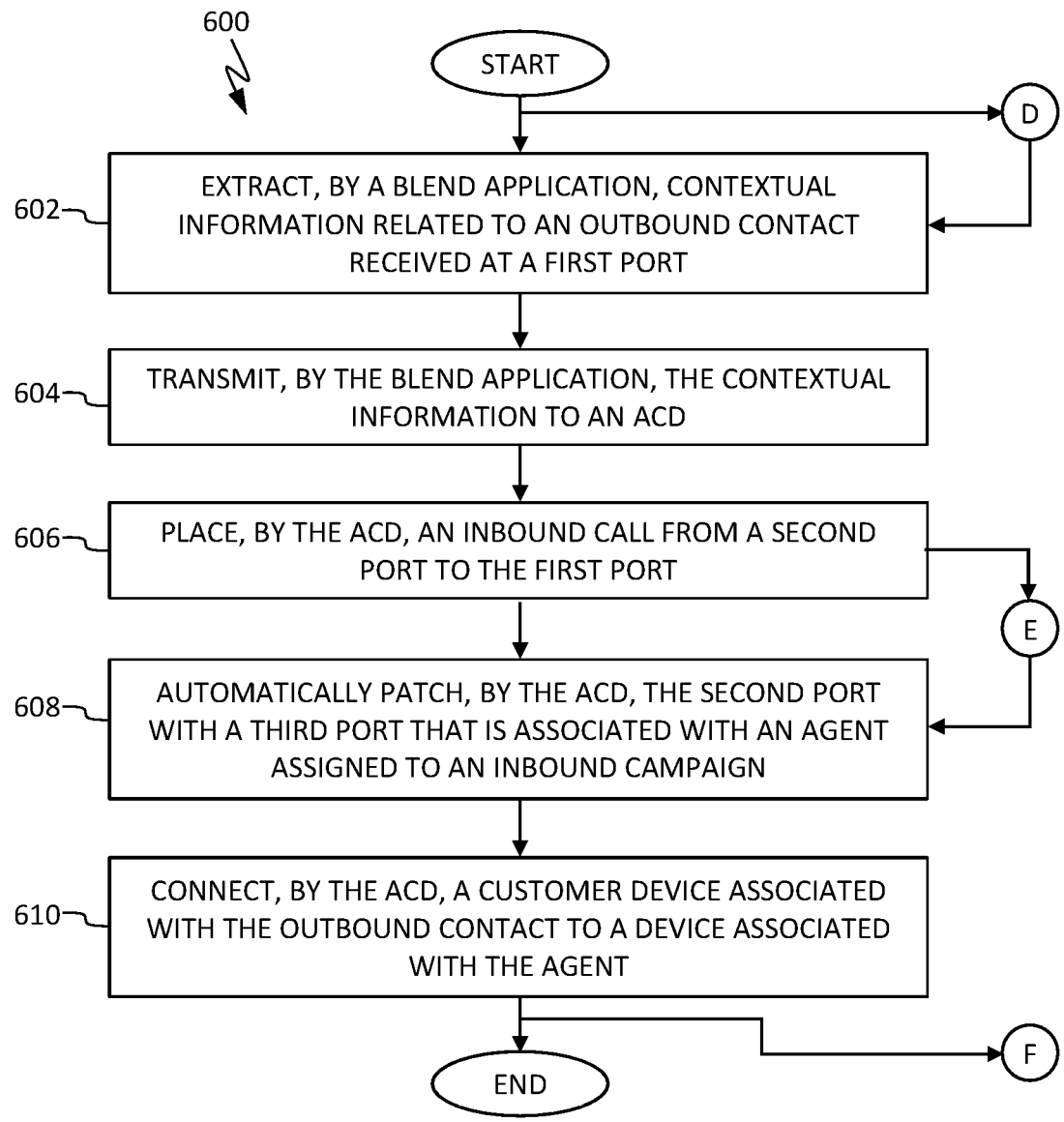
FIGS. 6A-6D are flowcharts of exemplary methods for assigning contacts in a contact center in accordance with another aspect of the present disclosure.

With reference to FIG. 6A, a method 600 for assigning contacts in a contact center begins at Step 602 in which a blend application may extract contextual information related to an outbound contact received at a first port. At Step 604, the blend application may transmit the contextual information to an ACD. The ACD may place an inbound call from a second port to the first port at Step 606, and at Step 608, the ACD may automatically patch the second port with a third port that is associated with an agent assigned to an inbound campaign. At Step 610, the ACD may connect a customer device associated with the outbound contact to a device associated with the agent, in which the agent remains assigned to the inbound campaign. The method 600 may then conclude.

Figure 6B:
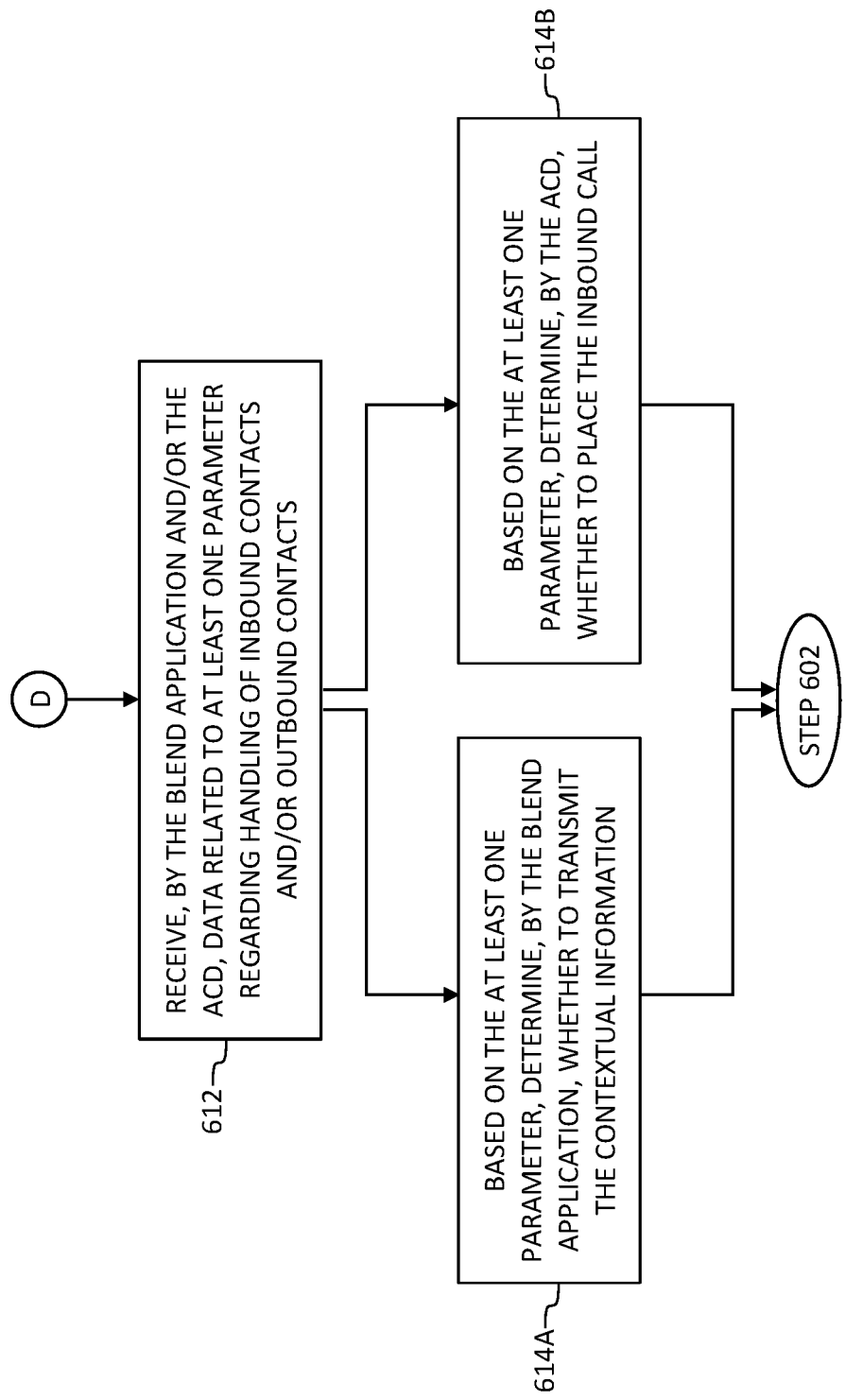

FIG. 6B illustrates additional, optional functions that may be performed by the blend application and/or the ACD. At Step 612, one or both of the blend application and the ACD may receive, e.g., from the outbound dialer, the ACD, or one or more other components within the contact center 102, data related to at least one parameter regarding one or both of inbound contacts and outbound contacts. When the blend application receives the data, the blend application may determine at Step 614A, based on the at least one parameter, whether to transmit the contextual information to the ACD in Step 604. When the ACD receives the data, the ACD may determine at Step 614B, based on the at least one parameter, whether to place the inbound call. Although Steps 612 and 614A/614B are depicted as occurring prior to or simultaneously with Step 602, it is understood that these Steps may also occur in between Steps 602 and 604 or simultaneously with Step 604.

Figure 6C:
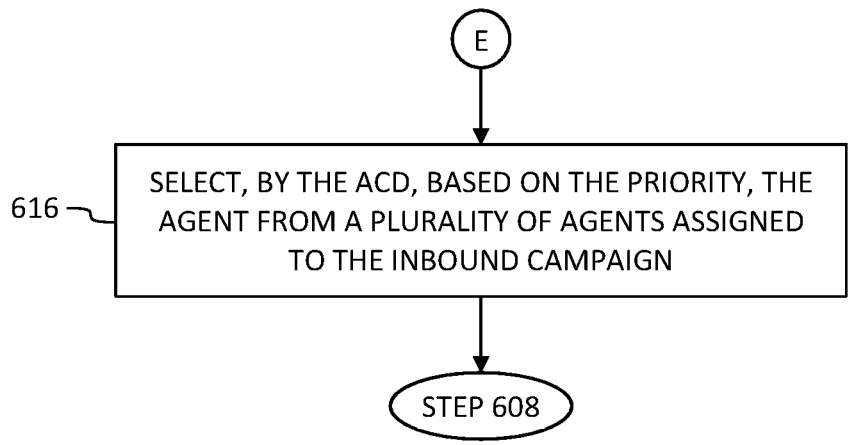

FIG. 6C illustrates an additional, optional function that may be performed following transmission of the contextual information in Step 604 of FIG. 6A. In some examples, the contextual information may further comprise an indication of a priority of the outbound contact, and the method may optionally comprise selecting, by the ACD, based on the priority, the agent from a plurality of agents assigned to the inbound campaign at Step 616. Step 616 may occur between Steps 606 and 608 of FIG. 6A or simultaneously with Step 606.

Figure 6D:
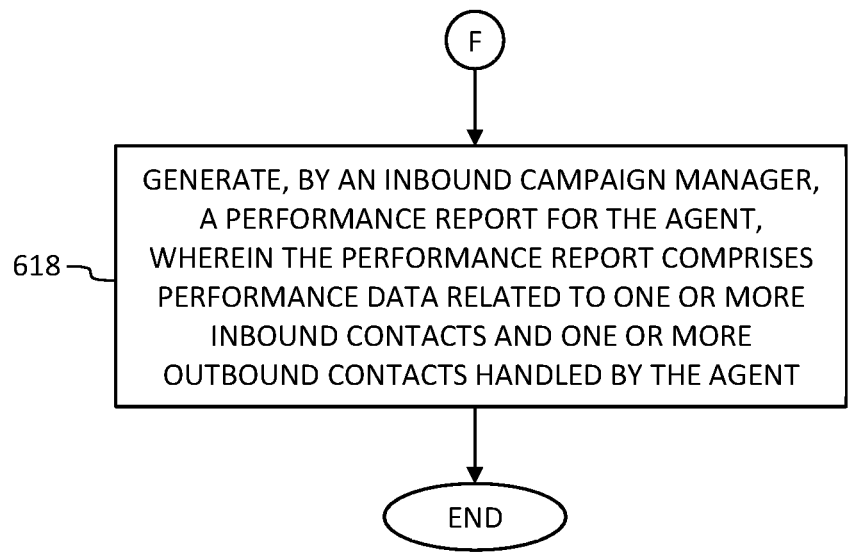

In further examples as shown in FIG. 6D, the method may further optionally comprise generating, by an inbound campaign manager, a performance report for the agent at Step 618, wherein the performance report comprises performance data related to one or more inbound contacts and one or more outbound contacts handled by the agent.

The flowchart(s) and block diagram(s) in the Figures illustrate the architecture, functionality, and operation of possible implementations of systems, methods and computer program products according to various aspects of the present disclosure. In this regard, each block in the flowchart(s) or block diagram(s) may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may include, but is not limited to, an electronic, magnetic, optical, electromagnetic, or semiconductor system, apparatus, or device, or any suitable combination thereof. More specific examples may include an electrical connection having one or more wires; a floppy disk; a flexible disk; a hard disk; magnetic tape or any other magnetic medium; a magneto-optical medium; a random access memory (RAM); a read-only memory (ROM); an erasable programmable read-only memory (EPROM or Flash memory); a solid state medium like a memory card, chip, or cartridge; a portable compact disc read-only memory (CD-ROM); an optical storage device; an optical fiber; or any suitable combination thereof. A digital file attachment to email or other self-contained information archive or set of archives may be considered a distribution medium equivalent to a tangible storage medium. When the computer-readable media is configured as a database, it is to be understood that the database may be any type of database, such as relational, hierarchical, object-oriented, and/or the like. In the context of this document, a computer-readable storage medium may be any tangible storage medium or distribution medium and prior art-recognized equivalents and successor media that may contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer-readable medium that when executed may direct a computer, other programmable data processing apparatus, or other devices to function in a particular manner, such that the instructions when stored in the computer-readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined into one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communication devices, at one or more users' premises, or some combination thereof. Similarly, one or more functional portions of the system could be distributed between a telecommunication device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for assigning contacts in a contact center, the method comprising:
   extracting, by a blend application, contextual information related to an inbound contact received at a first port;
   when the contextual information indicates that a customer associated with the inbound contact has requested an agent interaction, transmitting, by the blend application, the contextual information to an outbound dialer;
   placing, by the outbound dialer, an outbound call from a second port to the first port;
   automatically patching, by the outbound dialer, the second port with a third port that is associated with an agent assigned to an outbound campaign; and
   connecting, by the outbound dialer, a customer device associated with the inbound contact to a device associated with the agent, wherein the agent remains assigned to the outbound campaign.

2. The method of claim 1, further comprising:
   receiving, by at least one of the blend application or the outbound dialer, data related to at least one parameter regarding handling of one or both of inbound contacts and outbound contacts in the contact center;
   when the blend application receives the data, determining, by the blend application based on the data, whether to transmit the contextual information; and
   when the outbound dialer receives the data, determining, by the outbound dialer based on the data, whether to place the outbound call.

3. The method of claim 1, wherein the outbound campaign further comprises a plurality of outbound contacts, the method further comprising:
   queuing, by the outbound dialer, the inbound contact ahead of one or more of the plurality of outbound contacts.

4. The method of claim 1, wherein the contextual information further comprises an indication of a priority of the inbound contact.

5. The method of claim 4, wherein the outbound campaign further comprises a plurality of outbound contacts, the method further comprising:
   queuing, by the outbound dialer, based on the priority, the inbound contact ahead of one or more of the plurality of outbound contacts.

6. The method of claim 4, further comprising:
   selecting, by the outbound dialer, based on the priority, the agent from a plurality of agents assigned to the outbound campaign.

7. The method of claim 1, further comprising:
   generating, by an outbound campaign manager, a performance report for the agent, wherein the performance report comprises performance data related to one or more inbound contacts and one or more outbound contacts handled by the agent.

8. A system for assigning contacts in a contact center, the system comprising:
   a memory device, storing executable instructions;
   a processor in communication with the memory device, wherein the processor when executing the executable instructions implements a blend application and an outbound dialer,
   wherein the blend application when implemented:
      extracts contextual information related to an inbound contact received at a first port; and
      when the contextual information indicates that a customer associated with the inbound contact has requested an agent interaction, transmits the contextual information to the outbound dialer;
   wherein the outbound dialer when implemented:
      places an outbound call from a second port to the first port;
      automatically patches the second port with a third port that is associated with an agent assigned to an outbound campaign; and
      connects a customer device associated with the inbound contact to a device associated with the agent, wherein the agent remains assigned to the outbound campaign.

9. The system of claim 8, wherein the blend application when implemented further:
   receives data related to at least one parameter regarding handling of one or both of inbound contacts and outbound contacts in the contact center; and
   based on the data, determines whether to transmit the contextual information.

10. The system of claim 8, wherein the outbound dialer when implemented further:
    receives data related to at least one parameter regarding handling of one or both of inbound contacts and outbound contacts in the contact center; and
    based on the data, determines whether to place the outbound call.

11. The system of claim 8, wherein the outbound campaign further comprises a plurality of outbound contacts and wherein the outbound dialer when implemented further:
    queues the inbound contact ahead of one or more of the plurality of outbound contacts.

12. The system of claim 8, wherein the contextual information further comprises an indication of a priority of the inbound contact.

13. The system of claim 12, wherein the outbound campaign further comprises a plurality of outbound contacts and wherein the outbound dialer when implemented further:
    queues, based on the priority, the inbound contact ahead of one or more of the plurality of outbound contacts.

14. The system of claim 12, wherein the outbound dialer when implemented further:
    selects, based on the priority, the agent from a plurality of agents assigned to the outbound campaign.

15. The system of claim 8, wherein the processor when executing the executable instructions further implements an outbound campaign manager to:
    generate a performance report for the agent, wherein the performance report comprises performance data related to one or more inbound contacts and one or more outbound contacts handled by the agent.

16. A method for assigning contacts in a contact center, the method comprising:

extracting, by a blend application, contextual information related to an outbound contact associated with a first port;

transmitting, by the blend application, the contextual information to an automated call distributor (ACD);

placing, by the ACD, an inbound call from the first port to a second port;

automatically patching, by the ACD, the second port with a third port that is associated with an agent assigned to an inbound campaign; and connecting, by the ACD, a customer device associated with the outbound contact to a device associated with the agent, wherein the agent remains assigned to the inbound campaign.

17. The method of claim 16, further comprising:

receiving, by at least one of the blend application or the ACD, data related to at least one parameter regarding handling of one or both of inbound contacts and outbound contacts in the contact center;

when the blend application receives the data, determining, by the blend application based on the data, whether to transmit the contextual information; and when the ACD receives the data, determining, by the ACD based on the data, whether to place the inbound call.

18. The method of claim 16, wherein the contextual information further comprises an indication of a priority of the outbound contact.

19. The method of claim 18, further comprising:

selecting, by the ACD, based on the priority, the agent from a plurality of agents assigned to the inbound campaign.

20. The method of claim 16, further comprising:

generating, by an inbound campaign manager, a performance report for the agent, wherein the performance report comprises performance data related to one or more inbound contacts and one or more outbound contacts handled by the agent.

* * * * *